3,331,786
ENCAPSULATED CATALYSTS

Julius M. Bleuenstein, Taylor, Mich., assignor to Allied Chemical Corporation, New York, N.Y., a corporation of New York
No Drawing. Filed July 20, 1964, Ser. No. 383,959
10 Claims. (Cl. 252—429)

This invention relates to a composition useful in core compositions used in the hot box process for preparing molds or cores for use in the precision casting of molds. More particularly, this invention relates to an encapsulated catalyst useful in core molding compositions and to a method of preparing the same.

As is well known, the "hot box" process for preparing molds useful in the casting of molds comprises the production of sand cores which consist of sand bonded with a thermosetting resin. These cores are prepared by blowing a mixture of sand and a thermosetting resin binder into a heated metal pattern. The heat of the pattern cures the binder forming a thin shell on the pattern, the thickness of the shell being governed by the temperature of the pattern and the time of contact of the core composition, i.e. the mixture of sand and the thermosetting resin binder, together with catalysts, if used. Excess sand-binder mixture is removed from the shell for future use and the shell is heated to cure the binder to final hardness. Finally, the hardened shell is stripped from the pattern preparatory to mold assembly and metal casting operations.

In the hot box process as indicated above, resin solutions are added to the sand to be molded. Acid salts are also employed as catalysts to speed the curing action when the sand or core composition is heated. It has been found, however, that the acid catalysts initiate the curing action as early as when the sand mix is prepared and hence when the sand mixture or core composition is stored with acid salt catalysts curing takes place during the storage and continues until the composition is used. Due to progressive cure during storage of the core composition, complete uniformity of molds is difficult to attain.

It is an object of this invention to provide an encapsulated catalyst composition such that when used with an aqueous thermosetting binder solution such as one containing a urea-formaldehyde solution it gives a sand mix that is stable for a sufficient period of time to permit it to be applied to a hot core box, which catalyst composition does not substantially initiate curing of the thermosetting resin prior to use of the sand composition in the hot box process.

It is another object of this invention to provide such an encapsulated catalyst composition which when used in a core composition causes the core composition when in use in the hot box processes to harden rapidly, thus producing uniform cores for precision casting of metals.

It is another object of this invention to provide a process for producing the same.

These and other objects of this invention will become more apparent from the following complete description and claims.

In accordance with the present invention, an encapsulated catalyst composition for core molding compositions is prepared by mixing sand with ammonium chloride and adding thereto an encapsulating material of the group consisting of stearic acid and a thermoplastic resin, the temperature of the sand being between the liquefaction temperature of the encapsulating material and the decomposition temperature of the ammonium chloride and continuing the mixing until the ammonium chloride and sand is substantially coated with the encapsulating material. As a result of this process, there is obtained a mixture of sand, ammonium chloride, and encapsulating material, the ammonium chloride being substantially coated by the latter and the encapsulated ammonium chloride catalyst composition consisting of granular, free flowing discrete particles, the ammonium chloride being supported or carried on the sand particles within the encapsulating material. The encapsulated catalyst composition of this invention has a sand-like appearance, the encapsulation of the sand and ammonium chloride being determined by the wax-like feeling on the surface of the composition particles. This wax-like feeling indicates the $NH_4Cl$ and sand are both jointly coated with a sheath of stearic acid or thermoplastic resin as the case may be. Since the ammonium chloride catalyst is encapsulated, it can be introduced into standard core compositions containing sand and thermosetting resin and the core composition can be stored for a substantial period of time without appreciable curing of the thermosetting resin or initiation of the curing process prior to use in the hot box process.

In the process, it is preferred that the amount of sand to ammonium chloride to encapsulating material be in the ratio of 5–20:1:1–3 by weight. If the ratio of sand which is used in the encapsulated catalyst as a carrier for the $NH_4Cl$ to ammonium chloride in the encapsulated catayst composition is less than 5:1, the weight percent of ammonium chloride in the encapsulated catalyst is greater and the use of such encapsulated catalyst in the core composition becomes more critical in that it is not desired to have present in the core composition high amounts of catalyst. Amounts of ammonium chloride in excess of 3% by weight of the thermosetting resin can cause the core composition to set up too quickly when utilized in the hot box process. In this regard, it is preferred to have the ammonium chloride in the core composition be present in an amount between ½ and 3% by weight of the thermosetting resin binder. If the ammonium chloride is present in an amount less than ½% by weight of the thermosetting resin the setting up process of the core composition will take too long and production of core molds will become uneconomical. If the ratio of sand to ammonium chloride substantially exceeds 20:1 the amount of ammonium chloride per unit of encapsulated catalyst is thereby increased. Thus, when the catalyst is added to the sand and thermosetting resin binder more encapsulated catalyst will be needed so that the amount of the ammonium chloride will fall within the above preferred range of ½ to 3% by weight based on the weight of the theromsetting resin binder, with consequent waste of encapsulating material e.g. stearic acid as part of the encapsulated catalyst. Within this broad range of sand to ammonium chloride catalyst I prefer a ratio of 10:1 by weight.

With respect to the encapsulating material e.g. stearic acid, I prefer a ratio of ammonium chloride to stearic acid between 1:1 and 1:3. Amounts of stearic acid less than the ratio of 1:1 do not sufficiently coat the ammonium chloride and therefore, do not insulate it from catalytic activity when it is added to the core composition containing the thermosetting resin binder. Thus, since the catalyst would not be sufficiently coated, it could tend to initiate curing of the thermosetting resin binder in the core composition during storage. On the other hand, if the amount of encapsulating material is substantially above 3 parts by weight per part by weight of ammonium chloride, there is present an unnecessary amount of encapsulating material with resultant increase in cost and without substantial advantages being derived therefrom.

In preparing our granular, free flowing, encapsulated catalyst the temperature of the sand being mixed with the ammonium chloride is at least sufficient to liquefy the encapsulating material. Generally the temperature can be between 300° and 500° F. and in the case of stearic acid the temperature can be about 300° F. The temperature should not be so high as to cause degradation of the encapsulating material or decomposition of the NH₄Cl. It is to be realized that the temperature will vary depending upon the specific encapsulating material employed and whether or not it is introduced in solution form. This applies particularly to thermoplastic resins such as thermoplastic phenolic resins which can be added as solids or in solution form. When added in solution form the temperature of the sand should be sufficient to vaporize the resin solvent and maintain the resin in the liquid state for sufficient period of time to enable it upon being mixed with ammonium chloride to form a coating on the ammonium chloride and encapsulate the same. The encapsulating material should be relatively insoluble in the aqueous thermosetting binder solution of the core composition but should readily melt to release the ammonium chloride during the hot box process. Thus, phenol-formaldehyde thermoplastic resins have been found to be particularly useful in the process and as an encapsulating material in the encapsulated catalyst of this invention. Stearic acid which is also relatively insoluble in the aqueous binder solutions used in core compositions and which can readily melt under the conditions of temperature in the hot box process is also particularly suitable and is desired in view of its commercial availability and low cost.

It is preferred to utilize the new encapsulated catalyst in a core composition prepared by mixing about 50 parts of catalyst with 2000 parts of foundry sand and 50 parts of a binder solution containing 20 weight percent urea, 20 weight percent furfuryl alcohol and 60 weight percent of a liquid urea-formaldehyde concentrate having between 80 and 90% total solids and a formaldehyde to urea mol ratio between 4 and 6.5. The liquid urea-formaldehyde concentrate is readily available commercially and indentified as UF Concentrate 85 which has about 25% urea, 60% formaldehyde and 15% water. The binder solution of the core composition should contain between 10 and 40% furfuryl alcohol by weight and 2-3 mols of formaldehyde to urea to provide a thermosetting resin binder composition which will readily cure under the hot box process conditions and which is susceptible to the catalytic activity of the new encapsulated catalyst. The amount of thermosetting resin used in the core composition is usually between 1 and 3% by weight based on the amount of sand in the composition.

In order to more fully illustrate the nature of the instant invention and the manner of practicing the same, the following examples are presented.

EXAMPLE 1

Two pounds of crushed ammonium chloride, sifted through a 20-mesh screen, was dispersed in 20 pounds of heated (300° F.) Rockwood No. 2 sand in a Simpson muller. Two pounds of powdered stearic acid was added and melted on the sand. The formulation was mixed for five minutes and dumped. The cooled mix was a free-flowing particulate material.

About 2000 grams of Rockwood No. 2 sand at room temperature was placed in a small laboratory mixer. To the sand was added 50 grams of binder containing 100 parts urea, 100 parts furfuryl alcohol and 250 parts of UF Concentrate 85, and 50 grams of the stearic acid encapsulated sand and ammonium chloride prepared above. After thorough mixing, the mass broke down to a free-flowing coated sand. The sand mix remained stable and gave uniform cores after being stored a day or more.

To show utility, standard tensile strength test bars were prepared by pouring the coated sand into a metal mold pre-heated to 400° F., the mold being shaped to form symmetrical test bars which in the elevation view resemble hour glasses nipped into a one-inch width and which are a uniform 0.3 inch in depth. After 20 seconds of contact, the excess sand was removed and the bars were tested immediately and also after cooling to room temperature. The hot tensile strength averaged about 260 p.s.i. and the cold strength about 500 p.s.i. In the hot box operations, the cores showed surprising uniformity and gave commercially acceptable castings.

EXAMPLE 2

Three pounds of crushed ammonium chloride, sifted through a 20-mesh screen, was dispersed in 30 pounds of heated (300° F.) Rockwood No. 2 sand in a Simpson muller. When the temperature dropped to 200° F., 1.5 pounds of solvent-borne novolak resin was added. The formulation was mixed until the cooled mix became a free-flowing particulate material.

Thirty pounds of Rockwood No. 2 sand at room temperature was placed in a Simpson muller. To the sand was added 2 ounces of the phenolic encapsulated catalyst prepared herein, 9 ounces of binder containing 30 parts urea and 70 parts UF Concentrate 85, and 3 ounces of furfuryl alcohol. After thorough mixing the mass broke down into a free-flowing coated sand. To show utility, standard tensile strength tests were run as described in Example 1. The hot tensile strength averaged about 410 p.s.i. and the cold strength about 740 p.s.i.

It is readily seen from the foregoing that the new encapsulated catalyst is of significant importance in the core or shell molding compositions and solves the problems with which those in the art have heretofore faced.

While certain embodiments of the invention have been described herein, these have been described for purposes of illustrating the invention and not for purposes of limiting the same particularly since modification and departures will be obvious to those skilled in the art.

I claim:

1. A granular, free flowing, hot box process core composition encapsulated catalyst comprising about 1 part by weight of ammonium chloride supported on about 5-20 parts by weight of sand particles, said ammonium chloride and sand being encapsulated with about 1-3 parts by weight of an encapsulating material selected from the group consisting of stearic acid and phenolformaldehyde resins.

2. An encapsulated catalyst according to claim 1 wherein the ratio of sand to ammonium chloride to encapsulating material is 10:1:1.

3. An encapsulated catalyst according to claim 1 wherein said encapsulating material is stearic acid.

4. An encapsulated catalyst according to claim 1 wherein said encapsulating material is a phenolformaldehyde resin.

5. A process for preparing a granular, free flowing hot box core composition encapsulated catalyst which comprises mixing about 5-20 parts by weight of sand with about 1 part by weight of ammonium chloride and adding thereto about 1-3 parts by weight of an encapsulating material selected from the group consisting of stearic acid and a phenolformaldehyde resin, the temperature of the sand being between the liquefaction temperature of the encapsulating material and the decomposition temperature of the ammonium chloride and continuing the mixing until the ammonium chloride is substantially coated with the encapsulating material.

6. A process according to claim 5 wherein the encapsulating material is stearic acid and the temperature of the sand is about 300° F.

7. A process according to claim 5 wherein the ratio of sand to ammonium chloride to encapsulating material is 10:1:1 parts by weight.

8. A process according to claim 5 wherein the temperature of the sand is between 300° F. and 500° F.

9. A process according to claim 5 wherein the encapsulating material is a phenolformaldehyde resin.

10. A process according to claim 9 wherein said phenol-formaldehyde resin is introduced in solution form.

References Cited

UNITED STATES PATENTS

| | | | |
|---|---|---|---|
| 2,999,833 | 9/1961 | Bleuenstein | 260—38 |
| 3,018,264 | 1/1962 | Colclough. | |

FOREIGN PATENTS

| | | |
|---|---|---|
| 668,412 | 8/1963 | Canada. |
| 583,471 | 12/1946 | Great Britain. |

ALEXANDER H. BRODMERKEL, *Primary Examiner.*

L. B. HAYES, *Assistant Examiner.*